INVENTOR

United States Patent Office 3,187,366
Patented June 8, 1965

3,187,366
ATTACHING SPATULAS TO MIXERS
Mae Belle Esco Fant, 214 McSwain Drive,
Greenville, S.C.
Filed Jan. 4, 1961, Ser. No. 80,705
6 Claims. (Cl. 15—246)

The present invention relates generally to attaching a spatula to mixers for use with portable mixers and the designs with stationary bases.

We use mixers every day in the preparation of food and other substances and the proper piece of cutlery for stirring is a flexible scraper blade spatula. The present invention shows examples of how a spatula can be attached to the mixer after using, letting sticky substances drip back into the bowl, yet keeping it sanitary while in use.

It is the object of the invention to provide a way to always have a spatula ready which is the safe piece of cutlery to use with mixers.

Another object of the invention is to show how efficient and labor saving it will be to have a spatula on the mixer.

However, there are many ways to attach a spatula to mixers and the present invention shows drawing examples that are practical and easy to operate.

These examples show the saddles cast integral with the handle of the mixer.

They may also be made as a separate part and put on mixers.

These examples also show the spatula attached to the handle with the spatula well above the working position of the mixer beater blades so that the spatula scraper blade tip does not interfere with the beaters while they are in motion and yet can drip directly into the bowl.

The foregoing is a description of the accompany drawings of which:

Attention is directed specifically to the spatulas and saddles and methods and place of attaching them to mixers.

Figure 1:
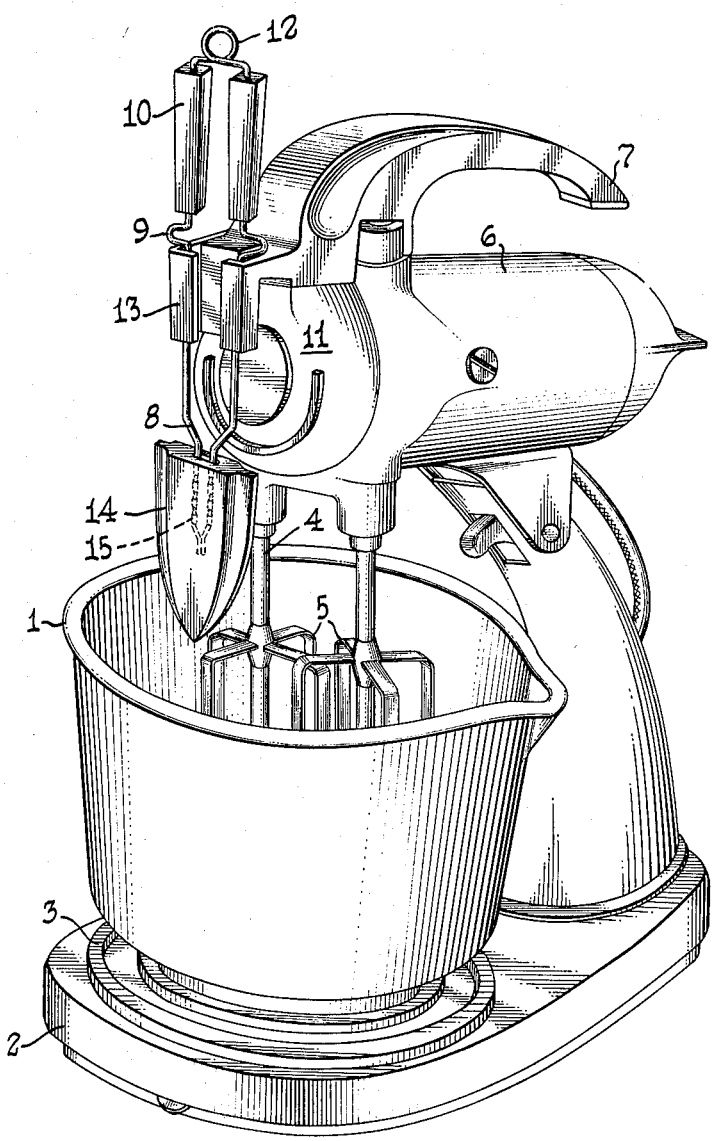
FIGURE 1 illustrates a mixer and spatula combination and particularly a spring wire type spatula handle held by a saddle cast integral with the handle of the mixer.

No. 8 in FIGURE 1 is a spring wire type handle with two half loops 9 on each side to act as stops to be held in place on the mixer by a groove saddle 13. The top part of the handle 8 is partially covered to act as hand grips 10.

The handle 8 has a spring tension coil 12 at the top that may be singular or multiple with whole or half coil tension.

The handle 8 will flex to the grip so as to release from the saddle 13 or will expand and hold under tension in the saddle.

The handle 8 may be made by omitting the hand grips 10 and the half loops 9 since it is held into place by tension.

The saddle 13 is a groove or wedge type saddle cast integral with mixer handle 7. The saddle 13 may be any size sufficient to hold the weight of the spatula, while the entire spatula is held in place by spring wire tension. Likewise the spatula size must be made in proportion to the saddle.

No. 14 is a scraper blade of soft material substantially V shaped in outline with graduated edges, with full thickness toward the center. The scraper blade 14 is bonded to 8. The part of the handle 8 that is inserted into the scraper blade 14 is serrated as at 15 to hold them securely together.

The parts relating to the mixer that is shown in FIGURE 1 is 1 the mixing bowl, 2 the stationary base of the mixer, 3 the turn table for the bowl, 4 the shafts of the beaters and 5 the beater blades.

Figure 2:
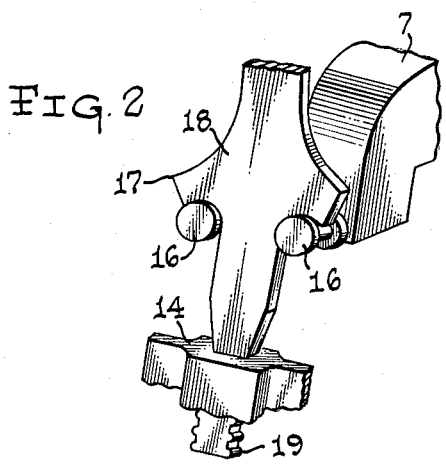
FIGURE 2 shows a tapering handle spatula with two arms to act as stops to be held by spool type saddles.

No. 18 in FIGURE 2 is a spatula with an arm on each side of the handle to hook the spatula on the saddle. The two arms 17 are of a size to fit into the grooves of the saddle thus holding the spatula securely above the beaters 5. The tapering of the handle enables one to lift the spatula up and out for use.

The saddles 16 are of spool or peg design with an annular groove to hold the spatula. These are made in proportion and designs to fit the arms 17 on the handle. The saddles 16 are cast integral with the front end of the mixer handle 7.

The serrations 19 are used on the end of the handle 18 that is inserted into the scraper blade 14 to hold the handle and blade securely together. The serrations 19 function in a manner similar to the serrations 15 on wire 8.

Figure 3:
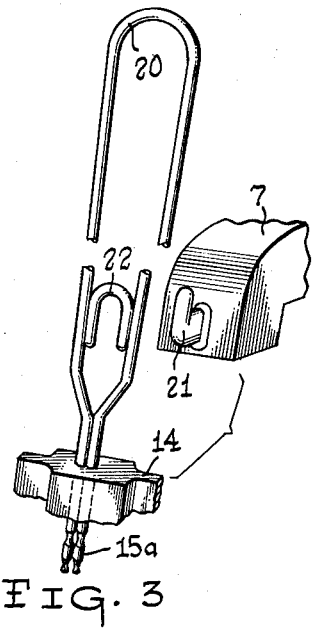
FIGURE 3 shows a wire type handle with a yoke to be held to the mixer by a hook type saddle.

The spatula handle made of wire 20 in FIGURE 3 is flared from the scraper blade 14 to the top. The handle 20 has a yoke 22 at an intermediate position to hook the spatula on the mixer. The yoke 22 can be bonded to or made integral with the handle 20 and made in an arch design to fit securely over the saddle 21 to hold the spatula in position to clear the beaters 5.

The spatula can be lifted up and off the saddle 21. The saddle 21 is a hook design made integral with the handle 7 of the mixer. The saddle 21 is made of proper size to receive the yoke 22 in the handle, there is a groove on the top of the saddle 21 to hold the spatula securely.

The scraper blade 14 is attached to the handle 20 as in the species of FIGURE 1, by providing serrations 15a.

Figure 4:
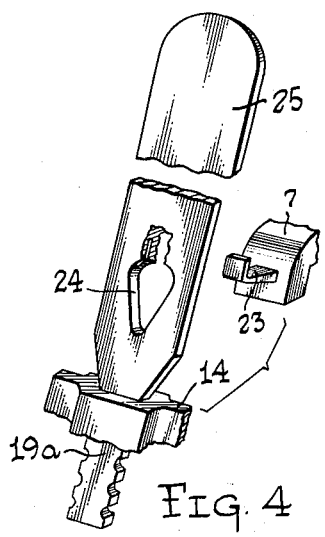
FIGURE 4 shows a pocket type perforation to be attached to a hook saddle.

The handle 25 in FIGURE 4 has a perforation 24 at an intermediate position to attach the spatula to the saddle 23. The perforation has a pocket communicating with the perforation to be hooked onto the saddle to hold the spatula securely. However, the perforation does not have to go entirely through the handle as shown in the drawing and also if the handle were made hollow instead of solid as shown, the slit in the top of the perforation could act as a pocket.

The hook saddle 23 is made integral with the handle 7 and likewise must be made of proper size so as to enable the user to lift the spatula up and off the saddle.

The same method of bonding the handle 24 and scraper blade 14 together is used as in the species of FIGURE 2, by providing serrations 19a.

Figure 5:
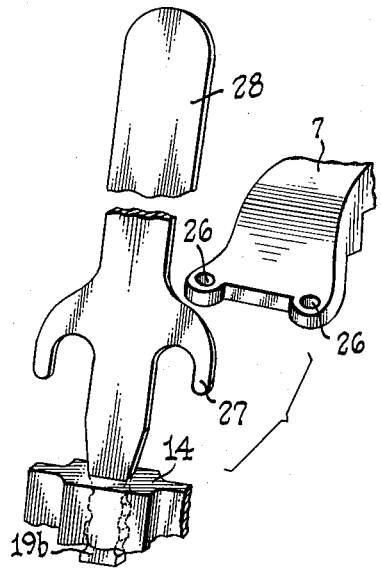
FIGURE 5 shows a handle with a pair of arm hooks to be held onto the mixer by a pair of pocket saddles.

The species of FIGURE 5 shows a handle 28 with a pair of hooks 27 on the sides thereof to be attached to a pair of saddles 26. The handle 28 in FIGURE 5 is a tapering handle with two hooks 27 on the sides to hook the spatula into the saddles 26. The hooks can be made integral with the handle 28 or can be made separately and attached to the handle, and can be of any design as long as it is in proportion to the designs of the saddles.

The saddles 26 are pocket designs made integral with the handle 7 and of a design so as to hold the spatula securely on the mixer while not in use. The saddles drawn show the pocket to be solid at the bottom, however, the bottom could be open, letting the saddles be of ring designs.

The handle 28 is attached to the scraper blade by serrations 19b as used in the species of FIGURE 4.

As clearly stated in the preceding descriptions the drawings are merely examples of how a spatula can be operated and attached to mixers. Any of these designs can be changed or rearranged or added to which would make them usable and still be within the scope of the present invention as claimed.

The present invention will be limited only by the specific claims as follows:

1. In a food mixer and spatula combination, a saddle attached to a handle portion of the mixer, said saddle having means to detachably support an implement, a spatula having a handle, means on said spatula handle detachably coupling the spatula to the saddle support means, said saddle support means being so located that the blade of the spatula in its assembled condition is positioned above and within the confines of the mixer bowl so that scraped material remaining on the spatula blade may drop back into the bowl.

2. In a food mixer and spatula combination, a saddle attached to a handle portion of the mixer, said saddle having a channeled portion with inwardly extending flanges projecting from the sides of the channel to form inwardly facing grooves, a spatula having a handle with substantially parallel spring wire portions movable toward each other, said spring wire portions being seated in the saddle grooves and detachable therefrom by collapsing the spring wire portions towards each other, the saddle being so located that the spatula in the assembled condition is positioned above and within the confines of the mixer bowl so that scraped material on the spatula blade may drop back into the bowl.

3. In a food mixer and spatula combination, saddles attached to a handle portion of the mixer, said saddles comprising spools having annular grooves, a spatula having a handle with outwardly extending arms, said handle arms being seated in the annular grooves of said saddles and detachable therefrom by lifting upward and outward from the saddles, said saddles being so located that the spatula in the assembled condition is positioned above and within the confines of the mixer bowl so that scraped material on the spatula blade may drop back into the bowl.

4. In a food mixer and spatula combination, a saddle attached to the handle portion of the mixer, said saddle comprising a hook with a vertical and a horizontal portion, said horizontal portion being substantially thicker in depth, a spatula having a wire handle, said handle having substantially parallel wire portions, said wire handle further including a single wire formed as an inverted yoke, the ends of said yoke being fused between the substantially parallel wire portions, said yoke being seated on the horizontal portion of said saddle and detachable therefrom by lifting upward and outward over the vertical portion of the saddle, said saddle being so located that the spatula in the assembled condition is positioned above and within the confines of the mixing bowl so that scraped material on the spatula blade may drop back into the bowl.

5. In a food mixer and spatula combination, a saddle attached to a handle portion of the mixer, said saddle comprising two substantially round recesses lying in a horizontal plane, a spatula having a tapering handle with lower portion being reduced and attached to a pliable tipped scraper blade, said handle having substantially round edges with two opposing outwardly and downwardly reduced arms, said spatula handle arms being seated in said recesses and removable therefrom by lifting upward and outward, said saddle being so located that the spatula in the assembled condition is positioned above and within the confines of the mixing bowl so that scraped material remaining on the spatula blade may drop back into the bowl.

6. In a food mixer and spatula combination, a saddle attached to a handle portion of the mixer, said saddle having a horizontal and a vertical portion, said horizontal portion being substantially a rectangular flat bar and together with said vertical portion forming a hook, a spatula having a handle of substantially parallel sides with a reduced lower portion attached to a pliable tipped scraper blade, said handle having an opening therein, a pocket in said handle communicating with said opening, the walls of said pocket being seated on the vertical portion of said saddle, and detachable therefrom by lifting said spatula handle upward and outward off said vertical portion of said saddle, said saddle being so located that the spatula in the assembled condition is positioned above and within the confines of the mixer bowl so that scraped material remaining on the spatula blade may drop back into the bowl.

References Cited by the Examiner
UNITED STATES PATENTS

| | | | |
|---|---|---|---|
| 1,945,897 | 2/34 | Haukedahl | 248—360 X |
| 2,047,288 | 7/36 | Phillips | 259—84 |
| 2,524,116 | 10/50 | Rein | 15—246 X |
| 2,565,624 | 8/51 | Phelon | 248—37.6 |
| 2,590,286 | 3/52 | Wirtanen et al. | 248—37.6 |
| 2,713,469 | 7/55 | Wright | 248—37.6 |
| 2,900,656 | 8/59 | Tupper | 15—245 |

CHARLES A. WILLMUTH, *Primary Examiner.*

LEO QUACKENBUSH, *Examiner.*